United States Patent Office 3,458,439
Patented July 29, 1969

3,458,439
ION EXCHANGE PROCESS AND REGENERATION
OF ANION EXCHANGE RESINS
Kenneth A. Schmidt, Chicago Ridge, Ill., assignor to Nalco
Chemical Company, Chicago, Ill., a corporation of
Delaware
No Drawing. Filed Feb. 8, 1965, Ser. No. 431,177
The portion of the term of the patent subsequent
to May 2, 1984, has been disclaimed
Int. Cl. C02b 1/76
U.S. Cl. 210—32                            1 Claim

ABSTRACT OF THE DISCLOSURE

A process for regenerating an acid exhausted anion exchange resin in the polyvalent salt form wherein said resin is rinsed with an alkali. The process provides a considerable saving of time and water and also increases bed capacity.

---

The present invention relates to an improved process for removing monovalent acids from solution and for regenerating anion exchange resins. More particularly, the subject invention is directed to the removal of ions such as $Cl^-$ and $NO_3^-$ from solution and to the regeneration of anion exchange resins in a polyvalent salt form, especially the conversion of resins exhausted to the bisulfate or acid phosphate form to the sulfate or phosphate form, respectively.

In the past, the most common method for removing mineral acids from aqueous solutions has been to contact the solutions with anion exchange resins in the hydroxide form. The anions of the aqueous acid solution are exchanged for the hydroxide group of the resin. It has been proposed to substitute anion exchange resins in the polyvalent salt form, and, in particular, in the sulfate form, for anion exchange resins in the hydroxide form of the prior art. The resultant ion exchange system has several distinct advantages over the prior art systems, especially where the anion exchange resin is used in conjunction with a cation exchange resin. These advantages are discussed in detail in my copending application Ser. No. 262,244, filed Mar. 1, 1963, now Patent No. 3,317,424, the disclosure of which is incorporated herein by reference.

Wherever an anion exchange resin in the polyvalent salt form is used to sorb acids from polar and/or semipolar solutions, it is necessary to regenerate or convert the exhausted resin to the sulfate form, phosphate form, etc. It is proposed in the prior art that this regeneration or conversion be accomplished by washing the bed with water. The regeneration of the bed in such cases is dependent on the following reaction:

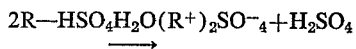

$$2R\text{—}HSO_4 H_2O \longrightarrow (R^+)_2 SO^=_4 + H_2SO_4$$

In this reaction, the regeneration is caused by the dissociation of $HSO^-_4$ to $SO^=_4 + H^+$. A majority of the $HSO^-_4$ ions of the anion exchange bed can be dissociated to $SO^=_4$ ions by employing a reasonable amount of water as a rinse. To obtain a 100% conversion of $HSO^-_4$ ions to $SO^=_4$ ions, however, requires the use of a very large amount of water. In fact, it takes in the neighborhood of 30 to 40 times the amount of water to neutralize the last 10–40% of the $HSO^-_4$ ions as it takes to neutralize the first 60–90% of $HSO^-_4$ ions.

Although in certain instances complete conversion of the $HSO^-_4$ ions (or the exhausted form of other polyvalent salt ions) is not required, there are instances where complete removal is of critical importance. For example, in the purification of food materials and materials such as glycerine or the like used in the preparation of cosmetics, it is important that substantially 100% of the acids be removed from the solution. If as little as 5–10% of the exhausting acid remains in the anion bed after regeneration, sulfate or bisulfate leakage occurs in the next exhaustion cycle. The capacity of the bed which is not fully regenerated, therefore, is lessened to a substantial degree where complete conversion of bisulfate to sulfate, for example, is not accomplished.

It is an object of the present invention to provide an improved process for regenerating or neutralizing acid exhausted polyvalent salt anion exchange resins.

It is another object to provide an improved process for regenerating an anion exchange bed wherever a bisulfate-sulfate equilibrium system or acid phosphate-phosphate equilibrium system is employed.

Another object is to provide an improved process for removing monovalent acids from solution.

Still another object is to provide an improved process for maintaining the effectiveness of an anion exchange at full capacity and in preventing bisulfate or sulfate or acid phosphate or phosphate leakage.

Another object is to provide an ion exchange process whereby complete purification of chemicals is promoted.

An additional object of this invention is to provide an effective method for eliminating large volumes of acidic waste. In some areas, it would be objectionable to sewer the large volumes of dilute acid produced by a water rinse regeneration of an $HSO^-_4$ anion exchanger. Under these conditions, the neutralization of such a large volume of dilute acid would be a definite problem in that huge holding tanks and/or feeders would be required.

Other objects will become apparent to those skilled in the art from the following detailed description of the invention.

In general, the present invention comprises the discovery that an improved process for regenerating an acid exhausted anion exchange bed in a polyvalent salt form results where the resin is rinsed with an alkali. In the process, either all or part of the $H^+$ ions sorbed by the anion resin bed are neutralized. By this process a considerable saving of time and water are realized and, in addition, increased bed capacity is obtained as well as a decreased amount of $SO^=_4$ and/or $HSO^-_4$ leakage during the exhaustion cycle. The process can be utilized wherever an anion exchange resin in the polyvalent salt form is employed such as in the bisulfate-sulfate equilibrium system or the acid phosphate-phosphate equilibrium system.

From a regeneration or conversion standpoint, the $HSO^-_4 \rightarrow SO^=_4$ reaction is independent of the anion resin used. For this reason both strong base anion exchange resins and weak base anion exchange resins are contemplated within the scope of this invention.

Briefly, the anion exchange resins used in the practice of the invention are strongly or weakly basic anion exchange resins, i.e., anion exchange resins which in the hydroxide form are capable of converting inorganic salts in aqueous solution directly to hydroxides. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The commercially available product Dowex 3 is an example of a polyamine-type weak base resin. Such resins usually contain a mixture of primary, secondary, and tertiary amine groups. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents 2,591,573, 2,597,440, 2,597,494, 2,614,099, 2,630,427, 2,632,000 and 2,632,001.

The strongly basic insoluble anion exchange resins which are preferably employed for the purpose of the invention are reaction products of a tertiary alkyl amine and a vinyl aromatic resin having halo methyl groups attached to aromatic nuclei in the resin and subsequently converted to the sulfate. Another class of strongly basic anion exchange resins suitable for the practice of the invention are the reaction products of tertiary carbocyclic or heterocyclic amines and vinyl aromatic resins having halo methyl groups attached to aromatic nuclei in the resin and subsequently converted to the sulfate.

The vinyl aromatic resins employed as starting materials in making the anion exchange resins employed in the preferred practice of the invention are the normally solid benzene-insoluble copolymers of a monovinyl aromatic compound and a polyvinyl aromatic compound containing from 0.5 to 40% by weight, preferably from 0.5 to 20% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. Patent 2,614,099, preferably to introduce an average of 0.2 to 1.5 halo methyl groups per aromatic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methylamino-2,3-propane diol, dioctyl ethanolamine, and homologues thereof.

The anion exchange resins can also be prepared by halogenating the molecule of the resin and then introducing an anion exchange group as described in U.S. Patent 2,632,000, and subsequently converting them to the sulfate, with or without admixture with the hydroxide form of the resin.

The preferred anion exchange resins used as starting materials in practicing the invention are Dowex SAR and Dowex SBR. The Dowex SBR is a styrene-divinylbenzene resin containing quaternary amine ion exchange groups in which the three R groups are methyl groups. This resin consists of spherical particles of 20 to 50 mesh and containing about 40% water. The divinylbenzene content is approximately 7.5%. The total exchange capacity is approximately 7.5%. The total exchange capacity is approximately 1.2 equivalents per liter, wet volume. The Dowex SAR is similar to the Dowex SBR except that one of the methyl groups in the quaternary amine salt structure is replaced by a hydroxy ethyl group. The Dowex SBR is somewhat more basic than the Dowex SAR.

As was pointed out in Patent No. 3,317,424, the equilibrium ion exchange system there described can be used effectively with respect to water demineralization. In this case the anion exchange resin in the polyvalent salt form is used in conjunction with a cation exchange resin in the hydrogen form. The cation exchange resin provides exchangeable hydrogen ions. Resins of this nature are known in the prior art, one of the most common types thereof being a sulfonated resin. Dowex HCR-W is a sulfonated styrene divinyl benzene strongly acid cation exchanger of the type described in U.S. Patent 2,366,007.

Another suitable type of hydrogen form cation exchange resin is a sulfonic acid phenol-formaldehyde resin such as a resin derived by condensing a phenol sulfonic acid with formaldehyde. In general, resins having a plurality of sulfonic acid groups are the most suitable cation exchange resins for purposes of this invention.

Briefly, the equilibrium ion exchange systems of the invention are exemplified by the following equations for demineralization of water or other polar liquid containing, by way of example, sodium, calcium and magnesium cations and chloride, sulfate, bicarbonate and nitrate anions. R represents the resins. The longer arrow indicates the predominant reaction in the equilibrium systems.

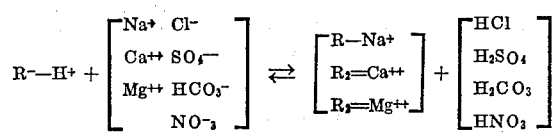

The carbonic acid may decompose in total or in part into water and carbon dioxide gas after it is formed.

*Demineralization Equation:*
*Cation:*
*Anion:*

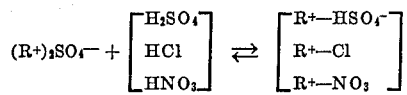

The reaction at an exchange site of the sulfate form anion exchange resin is fostered by the acidity of the aqueous media to convert one exchange site occupied by sulfate ion to bisulfate and sorb an anion in the aqueous phase on the other site. This may be illustrated, as follows, where $H^+X^-$ is the acid in the aqueous phase and $X^-$ is its anion.

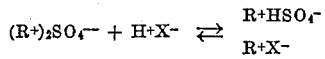

In demineralization of water, $X^-$ is predominantly one or more of $Cl^-$, $HSO_4^-$, $NO_3^-$, and $HCO_3^-$.

When strong acids such as hydrochloric acid, sulfuric acid, and nitric acid, produced as the effluent from the cation exchange resin, are passed downwardly for example, through a bed of such anion exchange resin, the top portion of the bed will be predominantly in the nitrate form, the mid-portion will be predominantly in the chloride form, and the lower portion of the bed will be predominantly in the bisulfate form.

The regeneration of the two resins with aqueous sulfuric acid, followed by an aqueous alkaline rinse may be exemplified by the following regeneration equations.

*Regeneration Equations:*
*Cation:*

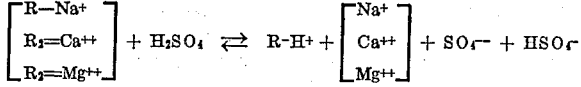

*Anion:*

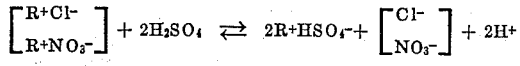

*Aqueous alkaline rinse:*

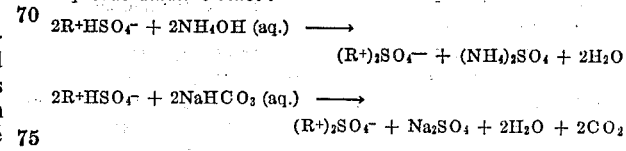

The following equation represents regeneration of the anion resin with aqueous sulfate salt solution.

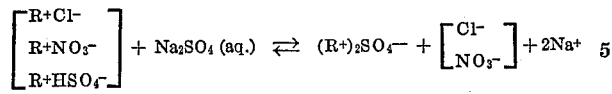

In a mixed bed, the volume ratio of cation exchange resin in the hydrogen form and anion exchange in the sulfate form may be in the range of about 6:1 to 1:6. The optimum ratio for any given water will depend upon the chemical content of the water, i.e., its alkalinity, bicarbonate content, etc. The exact proportions can be worked out without difficulty for each specific water in order to obtain exhaustion of both resin forms at about the same time.

It has been discovered that raw water or other polar liquid or semipolar liquid having relatively low ionized solids content to high ionized solids content can be demineralized or deionized at economical costs and with simple ion exchange and regeneration procedures. The hydrogen form cation exchange resin and the sulfate form anion exchange resin function with sufficient efficiency so as to remove 90% or more of the total ionized salts of raw waters. The process is a practical one for the demineralization of raw waters for municipal water treatment plants in providing water to be used for human consumption.

One of the chief advantages of the ion exchange system of the invention in the treatment of raw waters for municipal use is the low cost of the regenerants, i.e., sulfuric acid or raw water with or without sulfate salt supplement. Sulfuric acid is one of the most inexpensive manufactured chemicals available, whereas caustic soda, which is used in regenerating a strongly basic anion exchange resin to the hydroxide form or a weakly basic anion exchange resin to the free amine form, is much more expensive than sulfuric acid.

A further aspect of the invention relates to the use of ion exchange systems of the invention for the production of a substantially completely demineralized or deionized water. Because the operation of an ion exchange system of the invention is more economical than a system employing an anion exchange resin in the hydroxide form, substantially totally demineralized or deionized water can be produced utilizing the ion exchange system of the invention for the first or primary ion removal, followed by an ion exchange treatment with an anion exchange resin in the hydroxide form to remove anions of acids generated by the cation resin treatment but not removed in the first or primary treatment. The latter provides a polishing function in the removal of residual anions not removed by the anion exchange resin in the sulfate form in the primary or first treatment. If salts, as contrasted with the free acids, are present in the first or primary treatment effluent the polishing is done with both a cation exchange resin in the hydrogen form and an anion exchange resin in the hydroxide form. The primary treatment-polishing treatment above described is economically advantageous in that the more expensively regenerated anion exchange resin in the hydroxide form has a considerably smaller ion removal load and thus does not need to be regenerated as often.

$H_2SO_4$ REGENERATION

The aqueous sulfuric acid regeneration of the cation exchange resin to the hydrogen form is accomplished efficiently with sulfuric acid concentrations of about 1% or more, e.g., about 1% to 15% aqueous sulfuric acid, preferably about 2–10%.

The regenerant level, when defined on the total volume of mixed bed (and not on the cation fraction thereof) will vary (a) in proportion of cation to anion, and (b) in accordance with cation regeneration level needed. The following example illustrates the possible variations:

| Mixture | Acid required, lbs. | |
|---|---|---|
| | Per cu. ft. cation | Per cu. ft. mixed bed |
| 1C-1A | 5 | 2.5 |
| 1C-1A | 10 | 5.0 |
| 3C-1A | 10 | 7.5 |
| 1C-3A | 10 | 2.5 |

As an extreme regenerant level one could select a ratio of one cation to four anion and an acid dosage of three pounds of acid per cubic foot of cation, equivalent to a minimum of about 0.6 pound of acid per cubic foot of mixed bed. At the other extreme, one could select a ratio of four cation to one anion and a dosage of 15 pounds of sulfuric acid per cubic foot of cation, or 12 pounds of acid per cubic foot of mixed bed.

The preferred amount of acid should be based on a mixture containing equivalent capacity ratios of about 1 volume cation (21 kilograins per cubic foot capacity) to 1.5 volumes of anion (14 kilograins per cubic foot in the sulfate cycle) and an acid level of 4 pounds to 8 pounds per cubic foot of cation resin, equivalent to a mixed bed regeneration level of 1.6–3.2 pounds per cubic foot.

Acids other than sulfuric acid, e.g., aqueous hydrochloric acid, can be used to regenerate the cation exchange resin to the hydrogen form, especially when the cation exchange resin is employed in a bed separate from the anion exchange resin bed or is otherwise separated from the anion exchange resin during regeneration. However, as a practical matter, sulfuric acid regeneration of the cation exchange resin is ordinarily the most advantageous in view of the low cost of sulfuric acid and also the dual function afforded by sulfuric acid in also providing the bisulfate anion for regeneration of the anion exchange resin.

In a mixed bed consisting of a strongly basic anion exchange resin and a strongly acid cation exchange resin regeneration with sulfuric acid is by far the most expedient regeneration process. The mixed resin bed comprises relatively uniformly dispersed beads or particles of the two resins in physical admixture. As in the conventional methods of regeneration, the $H_2SO_4$ will displace the sorbed cations contained on the exhausted cation resin, providing on their ion exchange sites the cation $H^+$. In like manner, however, and occurring simultaneously in a mixed bed, the anions sorbed by the anion resin will be displaced by $HSO_4^-$ from the regenerant solution. After complete regeneration, the cation resin will be in the $H^+$ form; the anion resin will be in the $HSO_4^-$ form. Upon rinsing the anion resin with aqueous alkali, the $HSO_4^-$ will be neutralized to $SO_4^=$ (which will be held by the anion resin).

ALKALI RINSE

A wide variety of alkaline compounds can be used to make up the alkali rinse. These compounds can include highly soluble alkalis partially soluble alkalis and water dissolved gases. Specific representative materials include calcium hydroxide, magneisum hydroxide, calcium carbonate, magnesium carbonate, calcium bicarbonate, magnesium bicarbonate, sodium carbonate, sodium bicarbonate, sodium hydroxide, potassium carbonate, potassium bicarbonate, potassium hydroxide, and ammonium hydroxide (aqueous ammonia), among others. My preferred materials include lime and aqueous ammonia.

The total amount of alkali in the rinse water is related to stoichiometrically to the amount of hydrogen ion eluted into the rinse water by the conversion

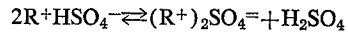

The quantity of alkali is best kept close to the stoichiometric amount required to neutralize the total hydrogen ion content contained on the anion exchange bed in the form of $HSO_4^-$. Furthermore, the anion exchange resin is best rinsed batchwise as a slurry where highly dissociated alkalis such as sodium hydroxide and sodium bicarbonate are used. The anions of these solutions have sufficient dissociation so that they tend to displace the newly regenerated sulfate groups on the resin if the resin is rinsed by flowing the alkali water through the bed. For example, if aqueous sodium hydroxide solution were flowed downwardly through an anion resin bed in the bisulfate form, the newly regenerated sulfate groups in the uper portion of the bed would be converted in a substantial proportion to hydroxide groups by the sodium hydroxide. Aqueous ammonia and calcium hydroxide, on the other hand, have little tendency to displace the sulfate groups and can be used in a bed rinse.

Accordingly, among the aqueous alkali rinse solution, aqueous ammonia is the most efficient because its hydroxide ions have the least tendency to be consumed in the side reaction of displacement of sulfate groups on the resin with hydroxide groups. Therefore, the total amount of ammonia used in the rinse may be about the stoichiometric equivalent of the eluted hydrogen ion, or a slight excess, e.g., up to about 110% of the stoichiometric equivalent. With aqueous sodium hydroxide or aqueous sodium bicarbonate rinse solution, on the other hand, the excess needed for complete neutralization of eluted hydrogen ion may be greater due to consumption of part of the base by the aforesaid side reaction. For this reason, the total amount of sodium hydroxide or sodium bicarbonate required to effect complete neutralization of the eluted hydrogen ion may be as high as about 125% of the stoichiometric equivalent.

It is contemplated that in some cases it may be to advantage to use a starvation amount of alkali, i.e., less than the stoichiometric equivalent, in order to minimize the aforesaid side reaction. In such case, starvation amounts of any of the aforementioned alkali compounds as low as 50% of the stoichiometric equivalent may be used. Therefore, with an aqueous alkali rinse wherein sodium hydroxide or sodium bicarbonate is the alkali compound, the total amount of alkali component in the rinse water may be 50–125% of the stoichiometric equivalent to the amount of eluted hydrogen ion. With an aqueous ammonia rinse, the percentage range is 50-110% of the stoichiometric equivalent. The concentration of the aforesaid alkali compounds in the rinse water is not of crucial importance and may be range from a few parts per million, e.g., 5 p.p.m., up to about 5%.

In rinsing a mixed bed with alkali to accomplish the anion regeneration from bisulfate to sulfate, the cation exchange resin would be experiencing, during regeneration exhaustion due to the metal cations of dissolved salts contained in the raw water. To eliminate this problem, a separate rinse of both resins may be employed.

The separate rinse procedure follows the regeneration of the mixed anion and cation exchange resins. The mixed resin bed is then backwashed at a sufficient velocity to agitate the bed. Under sufficient agitation the more dense cation exchange resin particles or beads will separate and settle in the bottom zone of the bed, while the less dense anion exchange particles or beads will be located in the upper portion of the bed. The alkali rinse can then be flowed downwardly through the anion exchange resin in the upper portion of the bed and tapped off at the approximate dividing line between the upper and lower resin layers so that it does not flow in any substantial degree into the lower portion of the bed containing cation resin. Simultaneously, a small amount of rinse water can be flowed upwardly through the lower portion of the bed to rinse out sulfuric acid regenerant in the lower portion of the bed. For further details as to the general technique, see U.S. Patent No. 2,771,424.

After a sufficient amount of alkali rinse is flowed through the upper portion of the bed containing the anion exchange resin to convert the latter from the bisulfate to the sulfate form, the bad can then be blown from the bottom portion thereof with air having a velocity sufficient to remix the bed, in which condition it is again ready for the demineralization phase of the process.

If an alkali rinse water contains sulfates, it is possible to regenerate the exhausted anion column by a downflow of the alkali rinse. In this instance the sulfate ions in the rinse water would compete with the chloride and nitrate ions at the upper part of the bed for the resin sites. In the lower portion of the bed the alkali would neutralize the acid phosphate or bisulfate ions. If the alkali rinse water does not contain sulfate ions, the bed can be regenerated by passing the alkali rinse upflow through the bed. In this case the acid phosphate or bisulfate ions would be neutralized by the alkali and the chloride and nitrate ions at the upper portion of the bed would be displaced by the alkali rinse. If a downflow rinse procedure is still used, it would be necessary to wash the bed with $H_3PO_4$, for example, to displace the chloride and nitrate ions.

The use of the subject anion regeneration system has been illustrated in detail with respect to a process for demineralizing water. As is pointed out above, the subject process is suitable for use wherever an anion exchange resin in the polyvalent salt form is employed and wherein it is desired to remove the sorbed acid from the resin to convert the acid salt to its original regenerated $SO_4^=$ or $PO_4^\equiv$ form. Further examples of the sulfate-bisulfate and the like systems are set forth in U.S. Patents 2,738,322, 2,772,237, and 2,686,832, the disclosures of said patents being incorporated herein by reference. In general, these patents disclose methods of removing acids in various systems using anion exchange resins in the polyvalent sulfate salt form or the polyvalent phosphate salt form.

The following examples are illustrative of the subject invention.

Example 1

In each of a series of tests, Dowex-P resin in the sulfate form was exhausted to about 54% of operating capacity to the bisulfate form with sulfuric acid. The resin was rinsed with only deionized water and also with aqueous ammonia and deionized water for comparison of the regeneration phase of the process in converting the resin from bisulfate to sulfate. The resin bed had a cross-sectional area of 0.0029 sq. ft., a height of 1.81 ft., and a volume of 0.00527 cu. ft. The bed in the partially exhausted form was first rinsed with 150 ml. of deionized water to rinse out sulfuric acid, after which 100 ml. of 1.19 N $NH_4OH$ was flowed through the bed. The bed was then rinsed with deionized water at a rate of 0.24 gal./min./sq. ft. of bed area to the desired end-point, an effluent conductivity of 10 mmhos. This required about 500 ml., of deionized water.

On the other hand, when the bed was again partially exhausted to the same degree and thereafter rinsed with only deionized water, after 2750 ml. of water had flowed through the bed, the conductivity of the effluent was still about 35 mmhos. The change in conductivity of the bed at from 2500 ml. to 2750 ml. total deionized rinse water was only from about 45 mmhos to about 35 mmhos, which is indicative that hundreds more ml. of rinse water would be required before the conductivity of the effluent became 10 mmhos.

It will be appreciated that the alkali rinse procedure, therefore, offers the advantage of requiring considerably less rinse water to convert strongly basic anion exchange resins from the bisulfate form to the sulfate form. This is advantageous when the rinse water is deionized water, due to the cost of the latter, and also when the rinse water is a raw water, preferably a low solids water, because the ion content of the latter tends to displace sulfate or bisulfate ions on the resin with other anions during the rinsing. Furthermore, the regeneration time is less due to the smaller amount of total rinse water required.

Example 2

One hundred parts by volume of Dowex SBR-P resin in the sulfate form was exhausted completely in a column to the bisulfate form with 1% sulfuric acid. The bed was drained of sulfuric acid solution and transferred to a vessel equipped with an agitator. Deionized water was added in an amount sufficient to allow the resin to be stirred. Sodium bicarbonate aqueous solution (1 N) was added until the pH of the resin slurry was 6. The resin was transferred back to the column. Water used in transferring and mixture was about 400 parts by volume. An additional 250 parts by volume of deionized water were passed through the column to obtain an effluent conductivity of 5 mmhos.

When the resin bed was again fully exhausted as described above, it was rinsed only with deionized water. At a total rinse volume of 1500 parts by volume, the conductivity of the rinse effluent was still 23 mmhos; at 3000 parts by volume, 10 mmhos; at 6000 parts by volume, 8 mmhos; and at 10,000 parts by volume, 6 mmhos.

PHOSPHATE FORM

Instead of using an anion resin in the sulfate-bisulfate forms, the invention can be practiced also with the strongly basic anion exchange resin in the orthophosphate, hydrogen phosphate, and dihydrogen phosphate forms. For example, a strongly basic anion resin in the orthophosphate form can be used in a mixed bed or two-bed system in demineralization of water in accordance with the following equations:

Demineralization:

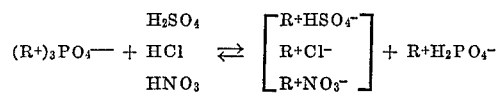

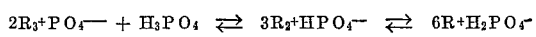

Regeneration, phosphoric acid:

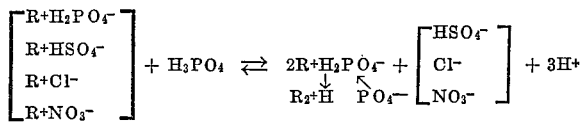

Water rinse:

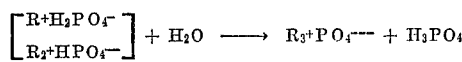

Regeneration, phosphate:

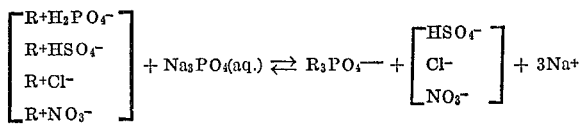

The phosphate form has an advantage over the sulfate form in that the phosphate anion has three dissocation stages instead of two, whereby a lesser mol equivalent of $PO_4^\equiv$ is required to occupy the resin exchange sites than is the case with $SO_4^=$. On the other hand, however, phosphoric acid and phosphates are ordinarily considerably more expensive than sulfuric acid and sulfates, respectively, whereby the sulfate-bisulfate system in most circumstances will be the more economical to operate. In cases where this situation does not exist, the phosphate-type anion exchange system can be employed to advantage in the same manner as the sulfate-type anion exchange system. Phosphoric acid or a phosphate salt, e.g., sodium orthophosphate, may be substituted for sulfuric acid or sulfate salt, respectively, in any of the foregoing examples. The resin may be regenerated to the orthophosphate form by employing the alkali rinse step with aqueous solutions of alkali metal hydroxides, aqueous ammonia, etc.

Obviously many modifications and variations of the invention as hereinbefore set forth may be made without departing from the spirit and scope thereof, and therefore only such limitations should be imposed as are indicated in the appended claim.

I claim:

1. In a process for regenerating an exhaust cation exchange resin to the hydrogen form and an exhausted anion exchange resin in the bisulfate form to the sulfate form, the step comprising: flowing dilute sulfuric acid through a bed of said resins while said resins are mixed and thereby simultaneously converting said anion exchange resin to the bisulfate form and the cation exchange resin to the hydrogen form, separating the anion exchange resin from the cation exchange resin, and subsequently converting the anion exchange resin in the bisulfate form to the sulfate form by rinsing said anion exchange resin with an aqueous alkali solution.

References Cited

UNITED STATES PATENTS

| | | | |
|---|---|---|---|
| 2,663,702 | 12/1953 | Kropa | 210—37 X |
| 2,772,237 | 11/1956 | Bauman et al. | 210—32 X |
| 2,868,832 | 1/1959 | Taylor et al. | 210—37 X |
| 3,156,531 | 11/1964 | Luten et al. | 210—37 X |
| 3,252,897 | 5/1966 | Hesler et al. | 210—38 X |
| 3,317,424 | 5/1967 | Schmidt | 210—37 X |

OTHER REFERENCES

Anderson et al.: "Industrial and Engineering Chemistry," vol. 47, issue 8, pp. 1620–1623, August 1955.

Helfferich: Ion Exchange, 1962 McGraw-Hill, New York, pp. 148–151.

REUBEN FRIEDMAN, Primary Examiner

C. M. DITLOW, Assistant Examiner

U.S. Cl. X.R.

210—35, 37, 38

UNITED STATES PATENT OFFICE
CERTIFICATE OF CORRECTION

Patent No. 3,458,439                                  July 29, 1969

Kenneth A. Schmidt

It is certified that error appears in the above identified patent and that said Letters Patent are hereby corrected as shown below:

Column 1, line 55, "$2R\text{-}HSO_4 H_2O (R^+)_2 SO^-_4 + H_2SO_4$" should read -- $2R\text{-}HSO_4 \xrightarrow{H_2O} (R^+)_2 SO^-_4 + H_2SO_4$ --; line 60, "$SO^-_4$" should read -- $SO^=_4$ --. Column 2, line 51, "$SO^-_4$" should read -- $SO^=_4$ --. Column 6, line 61, "magneisum" should read -- magnesium --. Column 8, line 30, "2,686,832" should read -- 2,868,832 --; line 39, "Dowex-P" should read -- Dowex-SBR-P --.

Signed and sealed this 28th day of April 1970.

(SEAL)
Attest:

Edward M. Fletcher, Jr.                          WILLIAM E. SCHUYLER, JR.
Attesting Officer                                        Commissioner of Patents